United States Patent
Kitten et al.

(10) Patent No.: US 7,712,485 B2
(45) Date of Patent: May 11, 2010

(54) CONTROL LEVER

(75) Inventors: Robert Kitten, Minneapolis, MN (US);
Joachim Meyer-Quade, Berlin (DE);
Henning Koschke, Berlin (DE)

(73) Assignee: Coactive Technologies, Inc., Newton, MA (US)

( * ) Notice: Subject to any disclaimer, the term of this patent is extended or adjusted under 35 U.S.C. 154(b) by 236 days.

(21) Appl. No.: 11/899,029

(22) Filed: Sep. 4, 2007

(65) Prior Publication Data
US 2008/0098846 A1   May 1, 2008

(30) Foreign Application Priority Data
Sep. 5, 2006   (DE) .................. 10 2006 042 629

(51) Int. Cl.
*F15B 13/06* (2006.01)
(52) U.S. Cl. ..................... 137/636; 137/636.2; 137/909
(58) Field of Classification Search ...... 137/636–636.4, 137/909
See application file for complete search history.

(56) References Cited

U.S. PATENT DOCUMENTS

| 5,160,928 | A | * | 11/1992 | Rigat-Esselin et al. ... 137/636.2 |
| 5,452,745 | A | | 9/1995 | Kordonsky et al. |
| 5,857,492 | A | * | 1/1999 | Salamun .................. 137/636.1 |
| 6,568,470 | B2 | * | 5/2003 | Goodson et al. ............ 137/909 |
| 6,823,895 | B2 | * | 11/2004 | Hitchcock et al. ........... 137/909 |

FOREIGN PATENT DOCUMENTS

WO   WO 99/00615   7/1999

* cited by examiner

*Primary Examiner*—Kevin L Lee
(74) *Attorney, Agent, or Firm*—Pepper Hamilton LLP

(57) ABSTRACT

A control lever (10) is provided with a grip (12), which in a joint (14) having two degrees of freedom is supported in a housing (11) and can be switched from an initial position in various directions for activating shift elements (18, 19), whereby spring elements (41, 42) are provided for returning the grip (12) to its initial position, and with a functional device for overcoming a pressure point during the activation and/or for retaining a desired shift position. In order to provide functional devices in greater numbers in a gearshift lever of this type without requiring substantially more installation space or substantially higher costs, provision is made that the functional device is constituted by an electrically controllable hydraulic arrangement (35), which connects to diametrically opposing shift elements (18, 19), which can be activated by the grip (12) in two opposing directions of motion.

10 Claims, 2 Drawing Sheets

CONTROL LEVER

CROSS-REFERENCE

Applicant claims priority from German patent application 10 2006 042 629.0-26 filed Sep. 5, 2006.

BACKGROUND OF THE INVENTION

The present invention relates to a gearshift lever such as are used in construction vehicles.

Controls such as gearshift levers are known that have a universal joint and a spring mechanism for returning the grip to the central position. Arranged about said universal joint, generally speaking, are four pin-shaped shift elements which are pressed by a pressure spring against a limit stop and which extend to the pivot point of said universal joint. The limit stop has a shoulder on the pin-shaped shift element which presses against the housing. Mounted on the grip is a plate that extends to the pin-shaped shift elements. If the grip is shifted, the plate presses against a shift element, and a return force is exerted. In order to make additional functions in the controlled device perceptible to the user in a gearshift lever of this type, additional functional devices are realized for sudden changes in the return force (overcoming the pressure point) and/or retaining (locking) the shift element in a predetermined position. In the case of familiar, purely mechanical gearshift levers, functional devices of this type are realized by additional spring-activated pins or by ball thrust bearings.

The disadvantage herein is that realizing a pressure point or a locking function purely mechanically is often not possible in unlimited numbers because each additional mechanical element requires installation space and generates higher costs. Furthermore, the service life is limited by the wear and tear on these mechanical elements. Variable engagement of components is hardly possible.

SUMMARY OF THE INVENTION

The objective of the present invention is therefore to provide a control lever of the type cited above in which functional devices can be provided in greater numbers without requiring substantially more installation space or substantially higher costs.

As a result of the measures proposed according to the present invention, a gearshift lever can be realized in which functional devices for overcoming a pressure point during activation and/or for retaining a selected shift position can be achieved in a way that reduces wear and tear.

According to a first embodiment of the present invention, an electromagnetic, controllable valve that functions to choke and/or block a through flow is provided in a simple and economical manner.

In a preferred, second exemplary embodiment of the present invention, a magneto rheological fluid is used that is subject to a magnetic field in a simple manner for choking or blocking flow from one shift element to another.

Further details of the invention can be seen from the following description, in which the invention is described and explained in greater detail on the basis of the exemplary embodiment that is depicted in the drawing.

DESCRIPTION OF THE PREFERRED EMBODIMENT

Limited Description Of The Invention

Figure 1:
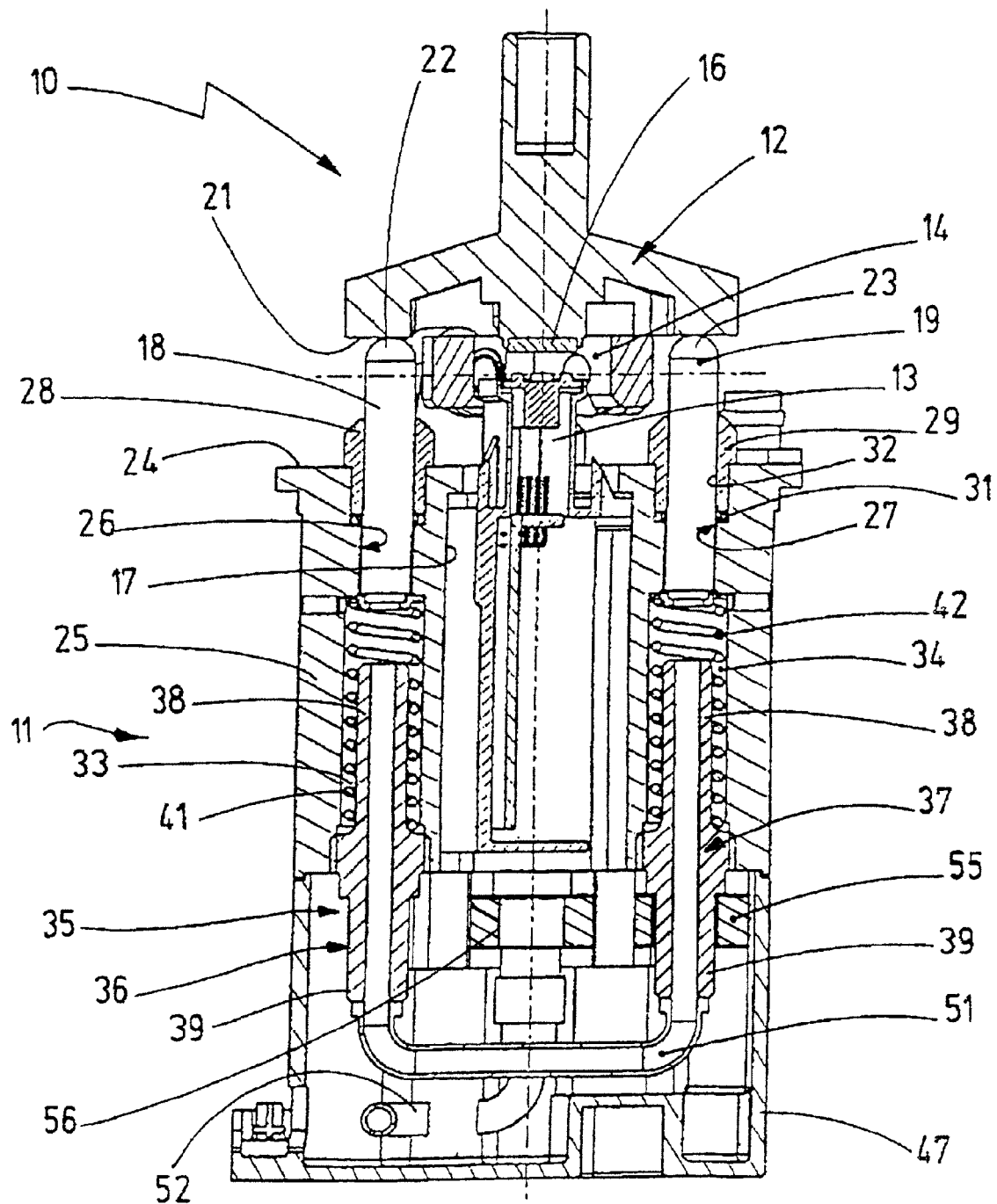
FIG. 1 is a longitudinal section view of a gearshift lever in accordance with a preferred exemplary embodiment of the present invention in a resting or initial position.

The lever 10, which can be used to control various machinery includes a handgrip 12 that can be pivoted to operate electrical switches at 15, and to depress selected shift element (s) 18, 19 (and two others, not shown). When a shift element is depressed, it depresses a disc 45 against the force of a spring 41, 42, and pushes hydraulic fluid that lies in line 51, out of the chamber, such as from one sleeve such as 41 to an opposite sleeve 42. The hydraulic fluid can be magneto rheological fluid whose viscosity can be greatly increased by a magnetic field produced by an electromagnet 55. If a moderate level magnetic field is applied, it requires more force to pivot the handgrip, while a large force can prevent pivoting.

In an example, the lever is used to control an excavator. A circuit that energizes the electromagnet 55 is programmed so when the excavator approaches a wall that should not be damaged, a low level of current is applied to the magnet 55 so the operator feels the increased resistance to pivoting of the hand grip. If the operator operates the handgrip to move the excavator closer to the wall, a higher current is applied to the magnet to more clearly warn the operator. Instead of using magneto rheologic fluid, applicant can place a valve along the connecting line 51, that has a variable valve opening. When there is a small opening, it requires more force to pivot the handgrip at a reasonable rate. In both of the systems, the operator receives a feedback indicating that the controlled equipment should not move rapidly in a predetermined direction.

Although particular embodiments of the invention have been described and illustrated herein, it is recognized that modifications and variations may readily occur to those skilled in the art, and consequently, it is intended that the claims be interpreted to cover such modifications and equivalents.

More Detailed Description

Control lever 10, which is depicted in the drawing in accordance with a preferred exemplary embodiment and is also known as a joystick, can serve to control construction vehicles and devices, for example.

Lever 10 has a housing 11 and a handgrip 12 that can move or swivel in multiple, for example, two degrees of freedom. Housing 11, which is essentially cylindrical, is centrally located and is provided with a fixed part 13 of a universal joint 14, whose movable part 15 is arranged on the lower side of a plate 16 of handgrip 12. Fixed part 13 of universal joint 14 is attached at the upper, open end of a central blind-hole opening 17 formed in housing 11. Pivoting of the plate in different direction s closes different electrical switches.

Lever 10 in the depicted exemplary embodiment is provided with shift elements that are arranged uniformly distributed over the periphery, whereby in the sectional representation only two shift elements 18 and 19 are represented, which are diametrically opposite each other. The two other shift elements are arranged diametrically opposite each other and are rotated 90° with respect to shift elements 18 and 19. Shift elements 18 and 19, like the other, undepicted shift elements, are configured in a pin-shaped manner and protrude in the axial direction into part 25 of housing 11 that surrounds blindhole opening 17, whereby with their upper free ends 22, 23 they are situated opposite an annular surface 21 of the lower side of plate 16 of grip 12, or they contact said annular surface in the initial position (FIG. 1) in an axially biased manner.

Starting from its annular surface 24 that is opposite handgrip 12, housing part 25 is provided with boreholes that extend axially and that, like the shift elements, are arranged uniformly distributed over the periphery, of which only boreholes 26, 27 are depicted, which are diametrically opposite each other. In the upper part of boreholes 26, 27 bearing sleeves 28, 29 are introduced that are axially fixed, protrude beyond annular surface 24, and are sealingly held against a shoulder of the borehole at their inner ends by a sealing ring 31. Bearing sleeves 28, 29 accommodate shift elements 18, 19 so that the latter are axially movable. Shift elements 18, 19 are directly guided within segments 32 of boreholes 26, 27, which are connected to said bearing sleeves and are smaller in diameter. Attached thereto and larger in diameter is a hydraulic chamber 33, 34 of a hydraulic arrangement 35. Hydraulic chambers 33, 34 are open to boreholes 26, 27 at the lower end of housing 11 and are each provided with an interior threaded borehole.

Screwed into each hydraulic chamber 33, 34 is an elongated sleeve 36, 37, whose interior end 38 in hydraulic chamber 33, 34 is smaller in diameter and is surrounded there by a pressure spring 41, 42, which at one end is supported at a shoulder, and at the other end is supported on a disk 45, which is supported on an annular shoulder between hydraulic chamber 33, 34 and borehole part 32. Engaging in this disk 45 is an end 44 of shift element 18, 19 that is smaller in diameter. Therefore, each shift element 18, 19 is acted upon by pressure spring 41, 42 such that, in the idle or initial position, shift elements 18, 19 are pressed against handgrip 12.

Lower ends 39 of elongated sleeves 36, 37 protrude from housing 11, which is supported on a pot-like element 47, into whose hollow space elongated sleeves 36, 37 extend, which are connected to each other by a connecting line 51. The Figures at least partially also indicate a connecting line 52 which is provided in the corresponding hydraulic chambers between the elongated sleeves that are rotated by 90°.

Figure 2:
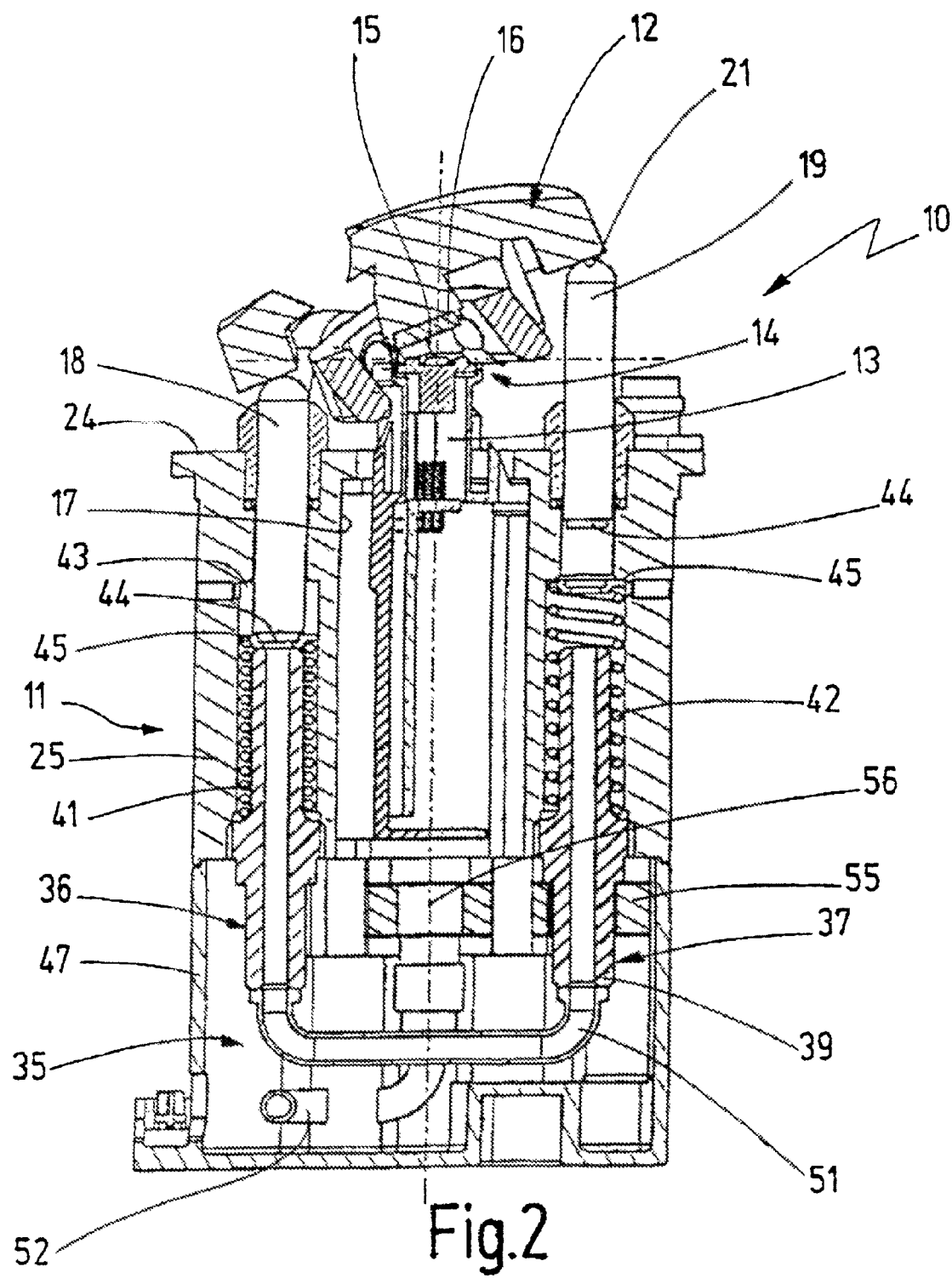
FIG. 2 depicts the gearshift lever according to FIG. 1 in one of many shift positions.

Hydraulic arrangement 35 is filled with a hydraulic fluid within hydraulic chambers 33, 34, and within elongated sleeves 36, 37, and their connecting line 51. This means that when handgrip 12 is turned in the direction of arrow A in accordance with FIG. 2, shift element 18 is axially pressed downwards. Because end 44 of shift element 18 engages in disk 45 and moves along with it, these two elements act as hydraulic pistons in hydraulic chamber 33, so that, at the other end of hydraulic arrangement 35, the hydraulic fluid presses through disk 45 onto shift element 19 moving it upwards in the direction of arrow B.

In the exemplary embodiment depicted, the hydraulic fluid is a magneto rheological fluid within hydraulic arrangement 35 as well as within the hydraulic arrangement that is rotated 90° with respect to the former. For controlling the flow rate of the hydraulic fluid within hydraulic arrangement 35, an electromagnet 55 is arranged, for example, on the right-hand side, about lower end 39 of elongated sleeve 37 of hydraulic arrangement 35, the electromagnet partly or entirely surrounding sleeve 37, 36 or another area of hydraulic arrangement 35. The viscosity of the magneto rheological fluid can be altered by the magnetic field of electromagnet 55. In other words, the functional device that results from the interaction of the magnetic field that is generated by electromagnet 55 and the magneto rheological fluid within hydraulic arrangement 35 can be controlled such that, during the activation of handgrip 12, by setting up an electromagnetic field the viscosity can be modified so that an artificial pressure point is produced. A further possibility of electromagnetically influencing the magneto rheological fluid consists in increasing the electromagnetic field so powerfully that the fluid in the area of electromagnet 55 is practically stationary or fixed, which amounts to blocking the flow through hydraulic arrangement 35. In this way, the selected shift position (for example, in accordance with FIG. 2) is retained, because pressure spring 41, here shown on the left side, is not capable of pressing shift element 18 into the initial position. Shift elements 18, 19 and therefore handgrip 12 can only reach their initial position when the electromagnetic field is no longer present.

It is obvious that this can also be achieved in an opposite motion of handgrip 12 or a motion of handgrip 12 that is rotated by 90°, as can be seen from partially depicted electromagnet 56 situated around connecting line 52 or its elongated sleeve.

According to one undepicted exemplary embodiment of the present invention, a customary hydraulic fluid in the form of a hydraulic oil is used within hydraulic arrangement 35. In place of an electromagnet 55, 56 in connecting line 51, 52, a throttling valve and/or a blocking valve is provided, which can either generate a pressure point by narrowing the through flow or retain a shift position by blocking the connecting line.

Obviously, the depiction in the drawing remains the same in a section that is rotated by 90° from the depicted section with respect to the arrangement of shift elements, hydraulic arrangements, and the like.

It is also obvious that, as is not depicted, specific machine and/or vehicle functions are accomplished using signals that are derived from sensor devices and that this also applies to the electrical driving of functional devices such as electromagnets, throttling or blocking valves, and the like.

What is claimed is:

1. A lever (10), having a grip (12) which is supported by a joint (14) in a housing (11) wherein the joint has two degrees of freedom and that allow the grip to be shifted from an initial position in various directions for activating shift elements (18, 19), wherein spring elements (41, 42) are provided for returning the grip (12) to its initial position, comprising:
    a functional device for overcoming a pressure point during the activation and/or for retaining a desired shift position, wherein the functional device is constituted by an electrically controllable hydraulic arrangement (35);
    said hydraulic arrangement (35) connects to a pair of shift elements (18, 19) that lie diametrically opposite each other and that can be activated by the grip (12) in two opposite directions of motion.

2. The lever as recited in claim 1, wherein the hydraulic arrangement (35) has a hydraulic cylinder (33, 34) that is assigned to each shift element (18, 119), and the two hydraulic cylinders (33, 34) are connected to each other by a pipe line (36, 37, 51), in which a throttling and/or blocking device (55) is arranged.

3. The lever as recited in claim 2, wherein the end (44) of the shift element (18, 19) that is facing away from the grip (12) directly or indirectly forms a hydraulic piston.

4. The lever as recited in claim 2 or 3, wherein the hydraulic arrangement (35) is filled with hydraulic oil, and the throttling and/or blocking device is formed in the pipe line by a valve that is electromagnetically controllable.

5. The lever as recited in claim 2 or 3, wherein the hydraulic arrangement (35) is filled with a magneto rheological fluid, and the throttling and/or blocking device has an electromagnet (55) that at least partially surrounds the pipe line (36, 37, 51) at one location.

6. The lever as recited in claim 3, wherein the hydraulic piston has a disk (45) that is arranged within the hydraulic cylinder (33, 34), that, axially stressed by a pressure spring (41, 42) within the hydraulic cylinder (33, 34), is supported on an interior shoulder of the hydraulic cylinder, and that is acted upon by the axially movable shift element (18, 19).

7. The lever as recited in claim 3, wherein a sleeve (36, 37) is inserted in a fluid-tight manner into the end of the hydraulic cylinder (33, 34) that is facing away from the shift element (18, 19), the hydraulic piston (45) of the activated shift element (18, 19) contacting the interior end of the sleeve.

8. The lever as recited in claim 7, wherein the end (39) of a sleeve (36, 37) of the hydraulic arrangement (35) that protrudes from the hydraulic cylinder (33, 34) is at least partially surrounded by the electromagnet (55).

9. A control which includes a grip that can be moved at least in first and second opposite directions, a pair of shift elements that are spring biased toward opposite sides of said grip and that are each depressable when the grip is moved in a corresponding direction, comprising:
walls forming a pair of fluid chambers containing fluid, with each shift element being moveable into a corresponding chamber to compress the fluid therein and urge it to flow out of the chamber;
operable means for controllably resisting the flow of fluid that lies in one of said chambers, out of the chamber, to thereby provide controllable resistance to the depression of the corresponding shift element.

10. The control described in claim 9 wherein:
said fluid in said fluid chambers is a magneto rheological fluid whose viscosity varies when it lies in a magnetic field that varies and said means for controllably resisting includes an electromagnet.

* * * * *